United States Patent [19]
Portner et al.

[11] 4,013,353
[45] Mar. 22, 1977

[54] OPTICAL REFLECTING SYSTEM

[75] Inventors: Robert Portner, Blackwood; Phillip Miller, Turnersville, both of N.J.

[73] Assignee: Magna Mir, Inc., Philadelphia, Pa.

[22] Filed: Jan. 7, 1976

[21] Appl. No.: 647,098

Related U.S. Application Data

[63] Continuation of Ser. No. 488,011, July 12, 1974, abandoned.

[52] U.S. Cl. .............................. 353/99; 350/55; 350/293; 353/121; 353/122
[51] Int. Cl.² .................. G03B 21/28; G02B 17/00; G02B 5/10
[58] Field of Search .......... 350/181, 199, 288, 293, 350/294, 296, 55; 353/69, 70, 77, 78, 98, 99, 121, 122; 352/69, 104; 355/60, 66

[56] References Cited
UNITED STATES PATENTS

| | | | |
|---|---|---|---|
| 2,651,967 | 9/1953 | Thoman | 352/104 |
| 2,786,387 | 3/1957 | Belok | 353/99 |

*Primary Examiner*—Steven L. Stephan
*Attorney, Agent, or Firm*—Steele & Petock

[57] ABSTRACT

A reflecting system utilizing a uniquely designed external mirror of specified shape to project and reflect light beams, distortion-free to the eye, from a light source to a receiving surface. The light source is uniquely positioned in relation to the mirror and supplemental mirrors may also be utilized to afford flexibility in the positioning of the elements. A uniquely designed reflector is constructed of a plurality of points specifically determined by an iterative method of solution utilizing as critical variables the size of the viewing surface, the distance from the light source to the reflector and the distance from the reflector to the receiving surface.

1 Claim, 7 Drawing Figures

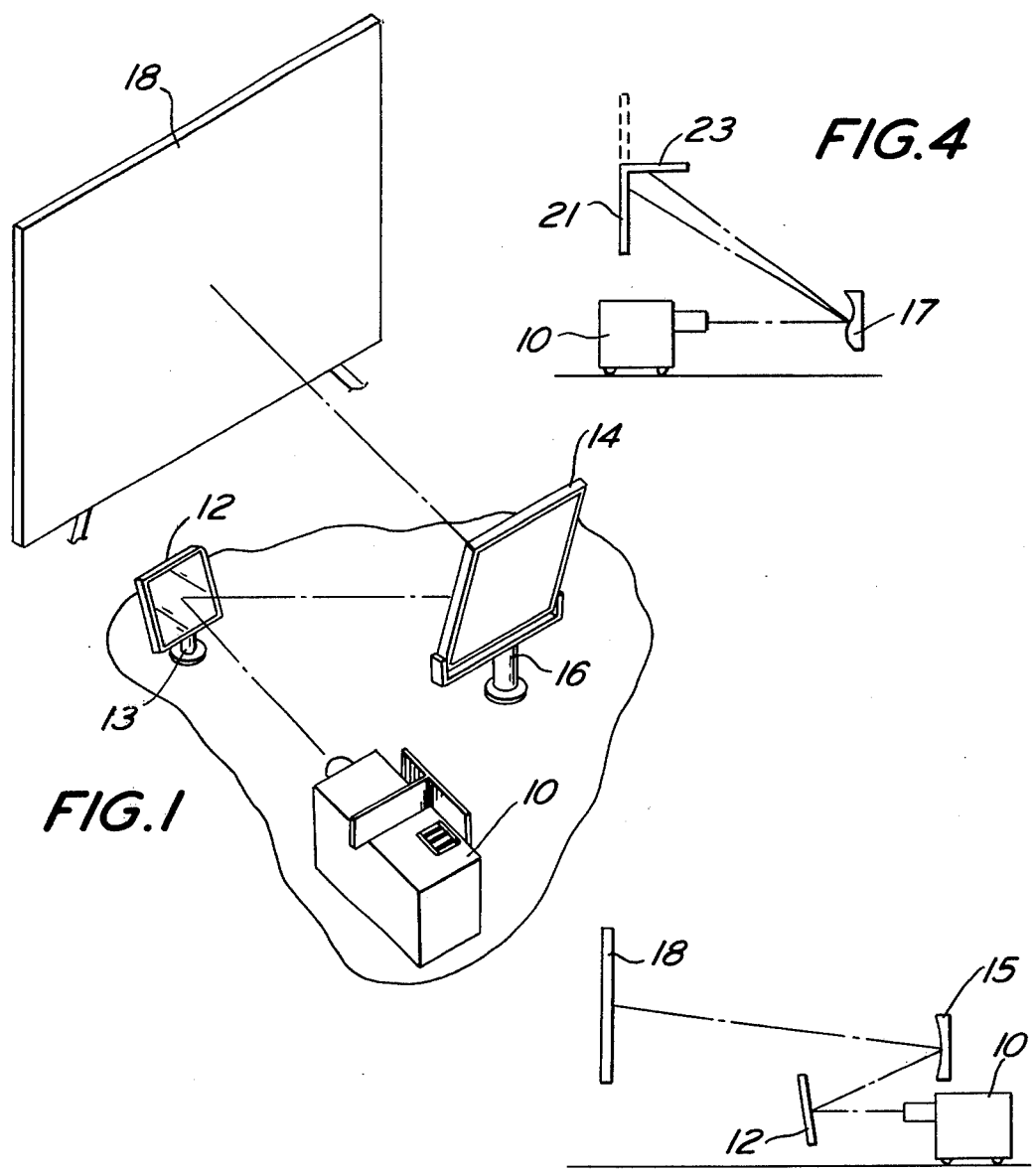
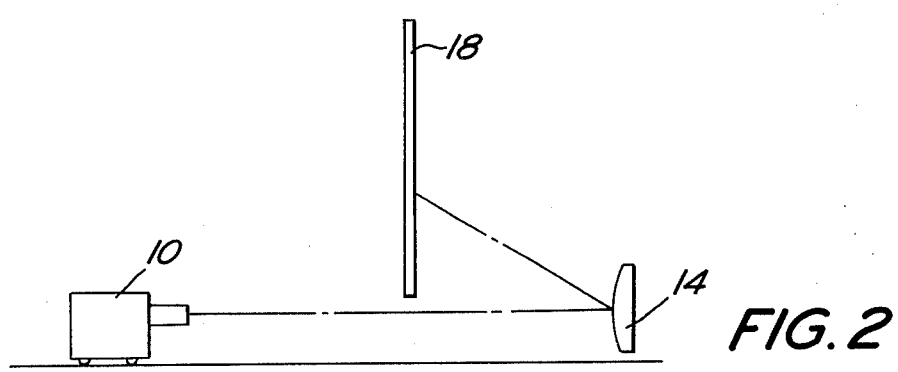

OPTICAL REFLECTING SYSTEM

This is a continuation of application Ser. No. 488,011, filed July 12, 1974 and now abandoned.

BACKGROUND OF THE INVENTION

The subject invention relates to an optical reflection system whereby an image is projected from a light source and by means of an intermediate mirror or mirrors, one of which is of a unique convex or concave or otherwise curvilinear configuration, onto a flat receiving surface. In such manner, a magnified or reduced image may be produced which will be distortion-free when the elements are properly positioned.

The system has utility with the projection and taking of X-ray negatives which now may be reduced to a manageable size; the system can be used to project television beams and the like and in addition, may be used for home movies and slides as is set forth in co-pending Applications Ser. Nos. 488,074, filed 7/12/74, and now abondoned; 499,010, filed 7/12/74, now U.S. Pat. No. 3,942,869; and Ser. No. 487,962, filed 7/12/74, now U.S. Pat. No. 3,940,209.

Curvilinear reflectors have been used to illuminate surface areas such as signs as disclosed in U.S. Pat. No. 2,145,880 — Cobb. The use of such reflectors, however, has been limited to reflection of light which may be diffused over a surface area without concern as to the production of distortion-free images.

Curved reflectors have also been utilized with projection apparatus as for example, in U.S. Pat. No. 3,630,604— Miller, however, it was necessary to use a curved viewing surface to be compatible with the curved reflectors to produce distortion-free images. Furthermore, in the projection field, systems providing novel projection effects have been utilized, however, none have successfully produced a distortion-free image utilizing a uniquely designed curvilinear mirror in conjunction with a flat receiving surface. Necessarily, an "off-axis" projection must be utilized and the inherent difficulties of eliminating distortion must be overcome.

SUMMARY OF THE INVENTION

Accordingly, it is an object of the subject invention to provide a reflection system which utilizes an off-axis technique while eliminating distortion which otherwise would prevent the effective projection of a desired image.

It is another object of the subject invention to provide a curvilinear reflector which may be convex or concave to be utilized within a system comprising a light emitting source and a receiving means in which distortion will not be seen when images are reflected to said receiving means.

It is still another object of the subject invention to provide a reflection system which can be used to provide greatly enlarged or reduced distortion-free images by utilizing a convex or concave reflector as part of the reflection system.

It is a related object of the subject invention to provide such a uniquely designed mirror to produce distortion-free images on a receiving means which may be defined by a method of solution.

In accordance with the above objects, a reflection system has been developed along with a uniquely designed convex or concave reflector whereby a light emitting source which provides intelligible projection of images, can be positioned in close proximity to a receiving means and through the use of the reflector, an enlarged, reduced or otherwise modified image may be reflected onto the screen. The positioning of the elements may be such that an auxiliary mirror or mirrors may be used to advantage. The precise configuration of the surface area of the curved mirror is critical to obtain the distortion-free image and this precise configuration is defined by the method of solution herein set forth which is used to establish coordinates for points on the mirror surface.

BRIEF DESCRIPTION OF THE DRAWINGS

FIG. 1 is a schematic showing the positioning of a light emitting source, an auxiliary mirror and a convex or concave mirror used to reflect an image onto a receiving surface, the figure being used to show the elements which may comprise the reflection system;

FIG. 2 shows the light emitting source and receiving surface utilized with a convex reflector as provided for by the specific method of solution herein set forth;

FIG. 3 discloses a light emitting source and an auxiliary reflection means which are used in conjunction with a concave mirror to provide reduced images;

FIG. 4 shows a combination concave and convex reflector means used to provide distortion-free images on a single surface or double receiving surface;

DETAILED DESCRIPTION

Figure 5:
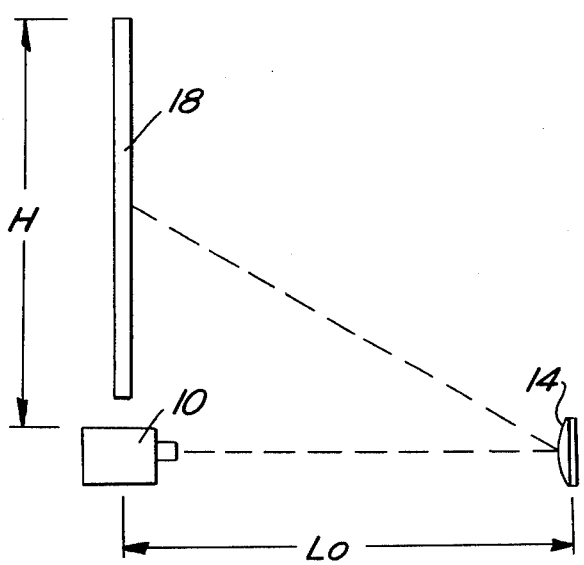
FIG. 5 is a schematic view showing variables that are used in the method of solution for determining the points on a convex reflector.

With reference to FIG. 1, a reflection system which happens to utilize a movie or slide projection system is shown comprising the elements set forth below. A projector means 10 it utilized which may be a standard movie or slide projector unit. Positioned in front of the projector 10 is an auxiliary flat reflector or mirror unit 12 on support 13 which may be positioned at an angle to reflect the light beam from the projector either horizontally or vertically or both as shown in the direction of the next element which is a convex reflector unit 14 positioned on support means 16. Both of the reflector units 12 and 14 may be pivotally mounted on supports 13, 16 as shown to provide for adjustability to enable precise guidance of the projected beam. The final element shown in FIG. 1 is receiving means or flat screen 18 which may be of any desirable size.

With reference to FIG. 2, the three elements, i.e., light emitting means shown as a projector 10, convex reflector 14 and receiving surface 18 are shown in the arrangement which the detailed method of solution hereinafter set forth is keyed to. When the method is described in detail, it will be appreciated that this is but one arrangement that can be utilized employing the teachings of the subject invention.

With respect to FIG. 3, the light emitting means or projector 10, auxiliary mirror 12 and receiving surface 18 are shown, however, in this embodiment, a concave mirror 15 is shown which will provide reduced images. With reference to FIG. 4, the light emitting source 10 is disclosed in use with a curvilinear reflector 17 having both convex and concave portions. The effect of these is to provide a partially enlarged and partially reduced series of images which may be shown on one surface 21 or a combination of surfaces 21 and 23 as shown in FIG. 4.

In each of the embodiments above described, the reflector members 14, 15, 17 are of critical designs which have been formulated to make them compatible with the light emitting source such as the lens of the projector 10, the distance which the mirrors will be placed from the projector 10 and the size of the screen 18 which will receive the image as produced by projector 10 and the reflector elements. The degree of curvature of the convex mirrors are determined by formulae which will now be set forth in detail and which will be used to establish points to define the exact configuration of the mirror surfaces since they are not standard surfaces of revolution nor can they be defined by aspheric curves such as parabolic, hyperbolic and compound combinations of the above curves. While predetermined values will be used as constants to produce the surface points which will define the mirror's curvature, it will be understood that any such predetermined values may be used and thus, the method of solution set forth herein may be used to provide a mirror for any set of similar data, i.e., any type of projector, positioned any distance from the mirror (mirrors, if the auxiliary flat mirror is used) and any desired size of screen.

Figure 6:
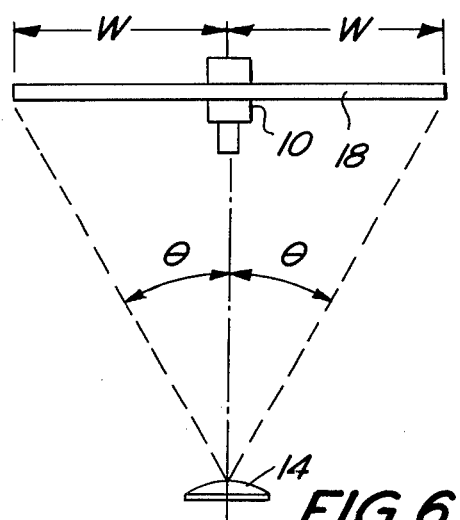
FIG. 6 is a top view of the schematic of FIG. 5 showing additional variables to be used in the method of solution.

The method of solution for determining the shape of the mirror 14 as utilized in FIG. 2 in which numerous points for the surface of the mirror 14 are located can be understood by receiving the following equations and steps. With reference to FIG. 5, a schematic side view is shown where the projector 10 is positioned below the screen 18 and the convex reflector surface 14 is positioned to reflect the rays from the projector 10 onto the screen 18. The variables that define the system are $L_0$ which is the distance the center light ray will travel from the light source to the mirror 14 and H which is the height above the light source that the mirror will reflect the light ray. A top view of the schematic of FIG. 5 is shown in FIG. 6 and as seen, W is the width that the mirror 14 will reflect the light ray; that is to say the distance to the side of the light source measured from the vertical plane of the light source. Theta is the angle of divergence that the light ray will make with the center beam, the vertical plane and the angle that it will make with the vertical in the horizontal plane.

It will be understood that these variables are dependent upon the projection lens, the distances used, and the size of the screen. Once the values of the variables are determined, they will be used in the method of solution as herein set forth. The method of solution comprises generally the establishment of a multiplicity of points with iterations as required by accuracy, on each of the points. The critical values as above set forth are the size of the viewing surface 18, the distance from the light source to the mirror 14, the distance from the mirror 14 to the viewing surface 18 which may be the same, and the angle of divergence of the light rays. In the example that follows, the following variables are used: $L_0$ will equal 48 inches, H will equal 12 to 84 inches; W which will be half of the width of a 6 by 8 screen will equal 48 inches; theta is the angle of divergence of the light source.

First, the steps will be set forth which are used to calculate a point on the Y axis of the mirror for the purposes of showing the progression of the method. The one-hundredth point on the Y axis will be calculated.

The coordinates that will be calculated are: $Y_i$ is the height (the distance above the point at which the center beam will strike the mirror); $X_i$ is the width (the distance to the side of the point where the center beam will strike the mirror); $Z_i$ is the depth (the distance to the front or back of the point at which the center beam will strike the surface of the mirror). The one-hundredth point will be taken in the upper portion of the mirror in the center which is on the Y-axis.

The first equation is:

$$Y_{100,0} = Y_{99,0} + S_{100,0} \sin(90° + A_{100,0}) \quad (1)$$

where $Y_{100,0}$ — height above (0,0,0) that the 100th point will be $Y_{99}$ — height that the 99th point is above point (0,0,0,) (already known from previous calculation)

$S_{100}$ — the incremental distance on the mirror surface, or incremental arc, from the 99th to the 100th point. For the first iteration, it will be the same as the value of $S_{99}$ (the incremental distance between the 99th and 98th point on the mirror)

$A_{100}$ — the angle that is made with the vertical when going from the 99th to the 100th point. For the first iteration, it will be the same as $A_{99}$.

$$Z_{100,0} = Z_{99,0} + S_{100,0} \sin(A_{100,0}) \quad (2)$$

where $Z_{100,0}$ — the distance behind point (0,0,0) that the 100th point will be $Z_{99,0}$ = the distance behind point (0,0,0) that the 99th point is.

$$L_{100,0} = \sqrt{+(L_0 + Z_{100,0})^2 + Y_{100,0}^2} \quad (3)$$

where $L_{100,0}$ = the distance the 100th ray will travel from the light source to the mirror.

$$\text{theta}_{100,0} = \text{TAN}^{-1}\left(\frac{(100)(2.9508197)}{150(L_0)}\right) \quad (4)$$

where theta $_{100,0}$ the angle of divergence, the 100th ray makes with the horizontal $L_0$ = the distance the center ray travels to the mirror.

$$H_{100,0} = 48 + \frac{(100)(36)}{150} \quad (5)$$

where $H_{100,0}$ = the height above the light source that the 100th ray will be reflected to. NOTE: since progression is from the center of the mirror up, then it is necessary to go from the center of the viewing surface up.

$$\text{Delta} = 90° - \text{theta}_{100,0} \quad (6)$$

where delta is the angle the 100th ray (enroute to the mirror) makes with the vertical $$D_{100,0} = \frac{\sqrt{(L_{100,0}^2) + (H_{100,0})^2 - 2(L_{100,0})(H_{100,0})}}{\cos(\text{Delta}_{100,0})} \quad (7)$$

where $D_{100,0}$ = the distance the 100th ray travels from the mirror to the viewing surface.

$$\text{Sigma}_{100,0} = \text{SIN}^{-1}\left(\frac{H_{100,0} \text{SIN Delta}_{100,0}}{D_{100,0}}\right) \qquad (8)$$

where $\text{Sigma}_{100,0}$ = the angle the 100the ray makes with itself, when it strikes the mirror it is reflected back.

$$\text{beta}_{100,0} = \frac{(180 - \text{Sigma}_{100,0})}{2} \qquad (9)$$

where beta is the angle the 100th ray makes with the mirror.

$$S_{100,0} = \frac{(L_{99,0}) \sin(\text{theta}_{100,0})}{\sin(\text{beta}_{100,0})} \qquad (10)$$

$$\text{Alpha}_{100,0} = 180 - 90° + \text{theta}_{100,0} - \text{beta}_{100,0} \qquad (11)$$

Using the new values of S and Alpha, the computations are repeated until Y and Z remain constant for two successive iterations.

The progression of the method of solution is that a value on the Y-axis is calculated then the positive values of the off axis values influenced by the Y value are calculated. For the method as will be set forth further the following variables are necessary:

T — the X co-ordinate of the image if it were a flat mirror $L_0$ distance away.

Gama — the angle a ray makes with the horizontal when the ray is off center.

The following steps are used for the calculation of Y-axis:

Given: $L_0 = 48$ inches $$S_0 \text{ - for original calculation only} = \frac{\sin 67.5°}{(48)(150)}$$

Alpha — 22.5°
$Y_0 = 0$
$H_0 = 48$ inches
$i = 0 \rightarrow 150$ by integers (increments of one)

Note: Previous $S_{i-1,0}$ and Alpha$_{i-1,0}$ are used when starting a new point. Also the $Y_{i-1,0} + Z_{i-1,0} + L_{i-1,0}$ values are carried over. Conversion is made from radians to degrees.

The following equations are programmed:

$$Y_{i,0} = Y_{i-1,0} + (S_{i,0}) \sin(90° - \text{Alpha}_{i,0}) \qquad (12)$$

$$Z_{i,0} = Z_{i-1,0} + (S_{i,0}) \sin(\text{Alpha}_{i,0}) \qquad (13)$$

$$L_{i,0} = \sqrt{(L_0 + Z_{i,0}^2) + Y_{i,0}^2} \qquad (14)$$

$$\text{Theta}_{i,0} = \text{Tan}^{-1}\left(\frac{(i)(2.9508197)}{(150)(L_0)}\right) \qquad (15)$$

$$H_{i,0} = 48 + \frac{(i)(36)}{150} \qquad (16)$$

$$\text{Delta}_{i,0} = 90° - \text{Theta}_{i,0} \qquad (17)$$

$$D_{i,0} = \sqrt{(L_{i,0}^2) + (H_{i,0}^2) - (2)(L_{i,0})(H_{i,0})\cos(\text{Delta}_{i,0})} \qquad (18)$$

$$\text{Sigma}_{i,0} = \sin^{-1}\left(\frac{(H_{i,0}) \sin(\text{Delta}_{i,0})}{D_{i,0}}\right) \qquad (19)$$

$$\text{Beta}_{i,0} = \frac{(180° - \text{Sigma}_{i,0})}{2} \qquad (20)$$

$$S_{i,0} = \frac{(L_{i-1,0}) \sin(\text{Theta}_{i,0} - \text{Theta}_{i-1,0})}{\sin(\text{beta}_{i,0})} \qquad (21)$$

$$\text{Alpha}_{i,0} = 180° - (90° \text{ Theta}_{i,0}) - \text{Beta}_{i,0} \qquad (22)$$

The following steps are used for the calculation of off-axis points:

Given:
$L_0 = 48$ inches
$S =$ for original calculation everytime only $$= \frac{3.9344262}{(200)(48)}$$

Alpha — for original calculation everytime only = 0°
$X_0 = 0$
$H_0 = 48$ inches
$J = 0 \quad 200$ by integers (increments of one)

The following equations are programmed:

$$X_{i,J} = X_{i,J-1} + (S_{i,J}) \sin(90° - \text{Alpha}_{i,J}) \qquad (23)$$

$$Z_{i,J} = Z_{i,J-1} + (S_{i,J}) \sin(\text{Alpha}_{i,J}) \qquad (24)$$

$$L_{i,J} = \sqrt{(L_0 + Z_{i,J}^2) + X_{i,J}^2} \qquad (25)$$

$$\text{Theta}_{i,J} = \text{Tan}^{-1}\left(\frac{(J)(3.9344262)}{(200)(L_0)}\right) \qquad (26)$$

$$W_{i,J} = \frac{(J)(48)}{200} \qquad (27)$$

$$\text{Delta}_{i,J} = 90° - \text{Theta}_{i,J} \qquad (28)$$

$$D_{i,J} = \sqrt{(L_{i,J}^2) + (W_{i,J}^2) - (2)(W_{i,J}) \cos(\text{Delta}_{i,J})} \qquad (29)$$

$$\text{Sigma}_{i,J} = \text{Sin}^{-1}\left(\frac{(W_{i,J}) \sin(\text{Delta}_{i,J})}{D_{i,J}}\right) \qquad (30)$$

$$\text{Beta}_{i,J} = \frac{(180° - \text{Sigma}_{i,J})}{2} \qquad (31)$$

$$S_{i,J} = \frac{(L_{i,J-1}) \sin(\text{Theta}_{i,J} - \text{Theta}_{i,J-1})}{\sin(\text{Beta}_{i,J})} \qquad (32)$$

$$\text{Alpha}_{i,J} + 180° (90° + \text{Theta}_{i,J}) - \text{Beta}_{i,J} \qquad (33)$$

The steps are repeated until $X = X$ and $Z = Z$ then $$T = \frac{(J)(3.9344262)}{200} \qquad (34)$$

$$\text{Tan (Gama}_{i,j}) = \frac{Y_{i,0}}{\sqrt{T + L_0^2}} \quad (35)$$

$$Y_{i,j} = \sqrt{(X_{i,T}^2) + (Z_{i,j}^2)} \text{ Tan (Gamai,T)} \quad (36)$$

For the lower corresponding portion of the mirror the equations used are:

$$Y_{i,o} = Y_{i-1,o} - (S_{i,o})\text{Sin }(90° - \text{Alpha}_{i,o}) \quad (37)$$

$$Z_{i,o} = Z_{i-1,o} - S_{i,o} \text{ Sin (Alpha}_{i,o}) \quad (38)$$

Use Equation (14)
Use Equation (15)

$$H_{i,o} = 48 - (i)(36)/(150) \quad (39)$$
$$\text{Delta}_{i,o} = 90° + \text{Theta}_{i,o} \quad (40)$$

Use Equation (17)
Use Equation (18)
Use Equation (19)
Use Equation (20)

$$S_{i,o} = \frac{(L_{i-1,0}) \sin(\text{Theta}_{i,o} - \text{Theta}_{i-1})}{\text{Sin (sigma}_{i,o} + \text{Beta}_{i,o})} \quad (41)$$

$$\text{Alpha}_{i,o} = \text{sigma}_{i,o} + \text{Theta}_{i,o} + \text{Beta}_{i,o} - 90° \quad (42)$$

By using the above equations the subject method of solution which is run through a computer calculates the necessary points for the surface of the mirror reflector as set forth below.

The first value that is calculated is $Y_{o,o}$ and $Z_{o,o}$. This is the first value on the Y axis.

Next, two hundred off-axis values are calculated which are influenced by the values calculated in step 1 so that they will have the correct H value.

Next, the computer goes back and calculates the next Y value. These values are for the top half of the mirror.

Once the top half of the mirror is calculated, the computer repeats the procedure for the bottom half as set forth above. A number of the Y axis equations are changed by positive and negative signs due to the center point of reference which is being used. Off-axis values for only one side need be computed since the mirror is symmetrical about the Y axis.

It will be readily apparent that once the X, Y, Z values for the mirror surface are known, a mold may be manufactured and the mirror produced according to the rigid specifications set forth and determined herein.

Figure 7:
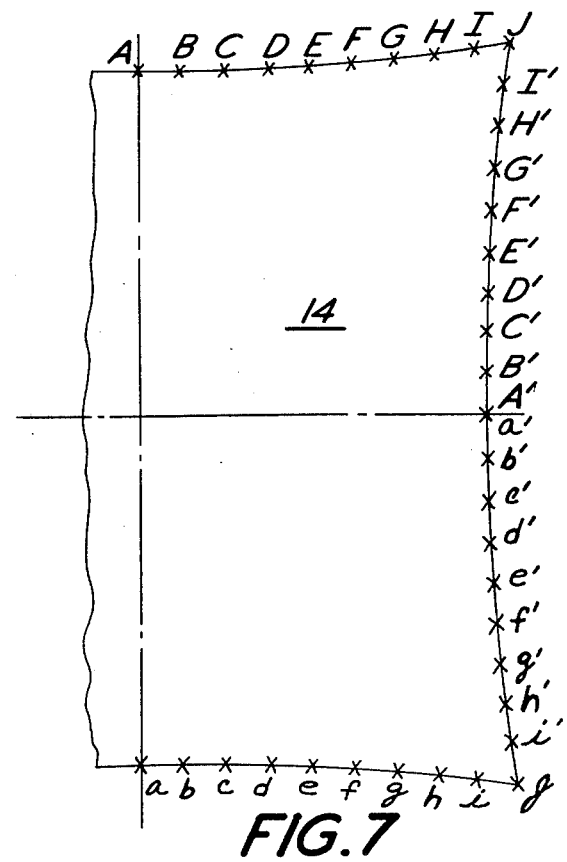
FIG. 7 shows a partial convex mirror based on a set of values derived from a method of solution herein set forth.

With reference to FIG. 7, one side of a convex mirror 14 is shown with its outer points plotted and identified by the reference letters. For a 32 mm lens where $L_0$ equals 48 inches, H equals 12 to 84 inches and W equals 48 inches, the following values are obtained using the method of solution above set forth:

| | | | |
|---|---|---|---|
| A' | X[15,200]=4.00510 | Y[15,200]=0.30116 | Z[15,200]=48.86217 |
| B' | X[30,200]=4.01568 | Y[30,200]=0.60553 | Z[30,200]=48.99130 |
| C' | X[45,200]=4.02665 | Y[45,200]=0.91330 | Z[45,200]=49.12510 |
| D' | X[60,200]=4.03800 | Y[60,200]=1.22467 | Z[60,200]=49.26356 |
| E' | X[75,200]=4.04970 | Y[75,200]=1.53979 | Z[75,200]=49.40633 |
| F' | X[90,200]=4.06173 | Y[90,200]=1.85883 | Z[90,200]=49.55311 |
| G' | X[105,200]=4.07409 | Y[105,200]=2.18196 | Z[105,200]=49.70390 |
| H' | X[120,200]=4.08675 | Y[120,200]=2.50931 | Z[120,200]=49.85833 |
| I' | X[135,200]=4.09970 | Y[135,200]=2.84105 | Z[135,200]=50.01640 |
| A | X[150,20]=0.40531 | Y[150,20]=3.13104 | Z[150,20]=49.44726 |
| B | X[150,40]=0.81099 | Y[150,40]=3.13249 | Z[150,40]=49.47016 |
| C | X[150,60]=1.21744 | Y[150,60]=3.13495 | Z[150,60]=49.50904 |
| D | X[150,80]=1.62503 | Y[150,80]=3.13839 | Z[150,80]=49.56344 |
| E | X[150,100]=2.03413 | Y[150,100]=3.14278 | Z[150,100]=49.63277 |
| F | X[150,120]=2.44506 | Y[150,120]=3.14807 | Z[150,120]=49.71619 |
| G | X[150,140]=2.85814 | Y[150,140]=3.15421 | Z[150,140]=49.81330 |
| H | X[150,160]=3.27365 | Y[150,160]=3.16177 | Z[150,160]=49.92313 |
| I | X[150,180]=3.69184 | Y[150,180]=3.16888 | Z[150,180]=50.04491 |
| J | X[150,200]=4.11294 | Y[150,200]=3.17730 | Z[150,200]=50.17786 |
| a' | X[15,200]=3.98508 | Y[15,200]=−0.29813 | Z[15,200]=48.61795 |
| b' | X[30,200]=3.97569 | Y[30,200]=−0.59343 | Z[30,200]=48.50337 |
| c' | X[45,200]=3.96676 | Y[45,200]=−0.88613 | Z[45,200]=48.39450 |
| d' | X[60,200]=3.95836 | Y[60,200]=−1.17646 | Z[60,200]=48.29194 |
| e' | X[75,200]=3.95048 | Y[75,200]=−1.46468 | Z[75,200]=48.19589 |
| f' | X[90,200]=3.94316 | Y[90,200]=−1.75105 | Z[90,200]=48.10651 |
| g' | X[105,200]=3.93643 | Y[105,200]=−2.03588 | Z[105,200]=48.02449 |
| h' | X[120,200]=3.93031 | Y[120,200]=−2.31943 | Z[120,200]=47.94983 |
| i' | X[135,200]=3.92485 | Y[135,200]=−2.60206 | Z[135,200]=47.88323 |
| a | X[150,20]=0.38600 | Y[150,20]=−2.83991 | Z[150,20]=47.09258 |
| b | X[150,40]=0.77239 | Y[150,40]=−2.84131 | Z[150,40]=47.11571 |
| c | X[150,60]=1.15955 | Y[150,60]=−2.84367 | Z[150,60]=47.15493 |
| d | X[150,80]=1.54786 | Y[150,80]=−2.84698 | Z[150,80]=47.20974 |
| e | X[150,100]=1.93768 | Y[150,100]=−2.85118 | Z[150,100]=47.27949 |
| f | X[150,120]=2.32934 | Y[150,120]=−2.85624 | Z[150,120]=47.36328 |
| g | X[150,140]=2.72315 | Y[150,140]=−2.86211 | Z[150,140]=47.46064 |
| h | X[150,160]=3.11938 | Y[150,160]=−2.86874 | Z[150,160]=47.57057 |
| i | X[150,180]=3.51828 | Y[150,180]=−2.87607 | Z[150,180]=47.69223 |
| j | X[150,200]=3.92007 | Y[150,200]=−2.88407 | Z[150,200]=47.82483 |

Once the method of solution has been utilized for given variables, slight alteration may be required as for example, lenses of different manufacture may have variables that will require adjustments in system positioning. While the variables used in the format of FIGS. 5 and 6 follow the element positioning of FIG. 2, it is apparent that a mirror may also be constructed for use in the system disclosed in FIGS. 1, 3 and 4.

It will be readily apparent that in place of a convex reflection system, a concave system may be utilized to reduce images. The invention in its broadest aspect may be considered as reflecting light beams whether magnified, reduced or through controlled distortion from a projector source onto a receiving surface through the use of combination or singular reflective surfaces such as compound sinosoidal curves and the like.

While various embodiments of the invention have been shown and described, it will be understood that other modifications may be made. The appended claims, therefore, are intended to define the true scope of the invention.

What is claimed is:

1. A reflection system comprising:
   a light emitting projecting means from which intelligible images are projected;
   said projecting means having a known focal length;
   a receiving surface;
   said receiving surface having a known maximum height and width;
   said receiving surface further being positioned at a known elevation with respect to said projecting means;
   an intermediate curved reflector positioned to receive beams from said projecting means and reflect said beams distortion-free against said receiving surface;
   the projection axis of said beams as emitted from said projection means being substantially perpendicular to the plane in which said receiving surface lies;
   said reflector having a surface curvature defined by a plurality of incremental arcs, the dimensions and angular disposition of which are successively determinable from each preceding incremental arc;
   a central incremental arc having dimensions and angular disposition having been determined from said focal length, said maximum height, said maximum width and said elevation, from which the first of said successive determinations is determinable; and,
   said plurality of incremental arcs having dimensions and angular disposition which are proportional to the dimensions and angular disposition of each said preceding incremental arc and the number of all said preceding incremental arc.

* * * * *